(12) United States Patent
Nishijima et al.

(10) Patent No.: US 9,912,933 B2
(45) Date of Patent: Mar. 6, 2018

(54) ROAD SURFACE DETECTION DEVICE AND ROAD SURFACE DETECTION SYSTEM

(71) Applicant: TOYOTA JIDOSHA KABUSHIKI KAISHA, Toyota-shi, Aichi-ken (JP)

(72) Inventors: Masakazu Nishijima, Ebina (JP); Fumio Sugaya, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 36 days.

(21) Appl. No.: 15/096,594

(22) Filed: Apr. 12, 2016

(65) Prior Publication Data

US 2016/0305785 A1  Oct. 20, 2016

(30) Foreign Application Priority Data

Apr. 17, 2015 (JP) .................................. 2015-084916

(51) Int. Cl.
*H04N 13/02* (2006.01)
*G06K 9/00* (2006.01)
*G01C 7/04* (2006.01)
*G01C 11/06* (2006.01)

(52) U.S. Cl.
CPC .......... *H04N 13/0203* (2013.01); *G01C 7/04* (2013.01); *G01C 11/06* (2013.01); *G06K 9/00798* (2013.01); *H04N 13/0239* (2013.01)

(58) Field of Classification Search
CPC ............................ H04N 13/0203; G02B 27/00
See application file for complete search history.

(56) References Cited

U.S. PATENT DOCUMENTS

| | | | | |
|---|---|---|---|---|
| 6,801,244 B2* | 10/2004 | Takeda | .................. | H04N 7/181 348/119 |
| 7,218,757 B2* | 5/2007 | Franz | ....................... | G06T 7/00 348/E13.014 |
| 7,612,800 B2* | 11/2009 | Okada | ..................... | G06T 7/248 348/169 |
| 8,509,523 B2* | 8/2013 | Schamp | .............. | B60R 21/0134 340/425.5 |
| 8,593,521 B2* | 11/2013 | Schofield | ........... | G06K 9/00818 348/148 |
| 8,599,001 B2* | 12/2013 | Schofield | ............... | B60N 2/002 340/425.5 |
| 8,636,393 B2* | 1/2014 | Schofield | ............. | B60Q 1/1423 362/464 |

(Continued)

*Primary Examiner* — Alex C Dunn
(74) *Attorney, Agent, or Firm* — Sughrue Mion, PLLC

(57) ABSTRACT

A road surface detection device that detects a road surface region based on disparity information obtained from a captured image of an area around a vehicle that is captured by an onboard camera, includes a path estimating portion that estimates a travel path where the vehicle will travel, based on driving information of the vehicle; and a detecting portion that weights the disparity information, and detects a road surface region in the captured image based on the weighted disparity information, wherein when the detecting portion weights the disparity information, the detecting portion gives less weight to the disparity information positioned on a side away from the travel path in the captured image than to the disparity information positioned on a side near the travel path in the captured image.

5 Claims, 8 Drawing Sheets

(56) References Cited

U.S. PATENT DOCUMENTS

| | | | | |
|---|---|---|---|---|
| 8,665,079 B2* | 3/2014 | Pawlicki | G06T 7/73 |
| | | | 340/435 |
| 9,315,151 B2* | 4/2016 | Taylor | B60R 1/00 |
| 9,319,637 B2* | 4/2016 | Lu | H04N 7/18 |
| 9,330,321 B2* | 5/2016 | Schamp | G06K 9/00805 |
| 9,436,880 B2* | 9/2016 | Bos | B60N 2/002 |
| 9,445,057 B2* | 9/2016 | May | H04N 7/18 |
| 9,488,483 B2* | 11/2016 | Ranganathan | G01C 21/30 |
| 2006/0074553 A1* | 4/2006 | Foo | G01C 21/367 |
| | | | 701/431 |
| 2007/0005609 A1* | 1/2007 | Breed | B60N 2/2863 |
| 2014/0071240 A1* | 3/2014 | Chen | G06T 7/70 |
| | | | 348/46 |
| 2015/0088802 A1* | 3/2015 | Jeon | B60W 10/04 |
| | | | 706/52 |
| 2015/0158526 A1* | 6/2015 | You | B62D 1/28 |
| | | | 701/42 |
| 2015/0177512 A1* | 6/2015 | Hayakawa | B60S 1/56 |
| | | | 348/148 |
| 2015/0203109 A1* | 7/2015 | McClain | B62D 15/025 |
| | | | 701/41 |
| 2016/0035220 A1* | 2/2016 | Paromtchik | G08G 1/0137 |
| | | | 701/117 |

* cited by examiner

ROAD SURFACE DETECTION DEVICE AND ROAD SURFACE DETECTION SYSTEM

INCORPORATION BY REFERENCE

The disclosure of Japanese Patent Application No. 2015-084916 filed on Apr. 17, 2015 including the specification, drawings and abstract is incorporated herein by reference in its entirety.

BACKGROUND OF THE INVENTION

1. Field of the Invention

The invention relates to a road surface detection device and a road surface detection system that detects a road surface region where a vehicle travels.

2. Description of Related Art

One known road surface detection device detects a road surface region where a vehicle travels, from disparity information in a captured image around a vehicle that has been captured by a stereo camera. US 2014/0071240 A describes one example of such a road surface detection device. The device described in US 2014/0071240 A detects a road surface region using disparity information (distance information) in a captured image.

Also, technology is known that detects a road surface region based on disparity information in an image region to the inside of a white line in a captured image, for example, in order to increase road surface region detection accuracy.

However, if a white line on a road is unable to be detected, or if there is no white line, the method that increases road surface region detection accuracy described above cannot be used. Therefore, in this technical field, there is a need to increase the road surface region detection accuracy not based on a white line detection result.

SUMMARY OF THE INVENTION

Thus, the invention provides a road surface detection device capable of increasing road surface region detection accuracy.

A first aspect of the invention relates to a road surface detection device that detects a road surface region based on disparity information obtained from a captured image of an area around a vehicle that is captured by an onboard camera. This road surface detection device includes a path estimating portion that estimates a travel path where the vehicle will travel, based on driving information of the vehicle, and a detecting portion that weights the disparity information, and detects a road surface region in the captured image based on the weighted disparity information. When the detecting portion weights the disparity information, the detecting portion gives less weight to the disparity information positioned on a side away from the travel path in the captured image than to the disparity information positioned on a side near the travel path in the captured image.

In this road surface detection device, more weight is given to disparity information that is positioned on the side near the travel path than is given to disparity information that is positioned on the side away from the travel path. Here, it is thought that the region around the travel path where the vehicle will travel is a road. Also, it is thought that it is highly likely that the region away from the travel path is not a road. Therefore, by more heavily weighting the disparity information that is positioned on the side near the travel path, the road surface detection device is able to inhibit the disparity information that is positioned on the side away from the travel path from affecting detection of the road surface region. Therefore, the road surface detection device is able to increase the road surface region detection accuracy.

In the first aspect described above, the path estimating portion may estimate the travel path, and estimate a curvature of a traveling lane of the vehicle based on the travel path. Also, when an amount of change per unit time in the curvature estimated by the path estimating portion is greater than a preset reference amount of change, the detecting portion may prohibit a process that gives the disparity information positioned on the side away from the travel path in the captured image less weight than the disparity information positioned on the side near the travel path in the captured image. For example, if the amount of change per unit time in the estimated curvature of the traveling lane is greater than the reference amount of change, the shape of the road is greatly fluctuating so the road shape following the estimated travel path will tend not to match the actual road shape. Therefore, not weighting the disparity information based on the distance from the travel path when the amount of change per unit time in the estimated curvature of the traveling lane is greater than the reference amount of change makes it possible to inhibit the weight of disparity information corresponding to a region that is not the road surface region from increasing.

A second aspect of the invention relates to a road surface detection device that detects a road surface region based on disparity information obtained from a captured image of an area around a vehicle that is captured by an onboard camera. This road surface detection device includes a path estimating portion that estimates a travel path where the vehicle will travel, based on driving information of the vehicle, and a detecting portion that weights the disparity information, and detects a road surface region in the captured image based on the weighted disparity information. When the detecting portion weights the disparity information, the detecting portion gives less weight to the disparity information positioned outside a predetermined area that is determined in advance from the travel path in the captured image than to the disparity information positioned inside the predetermined area.

In this road surface detection device, more weight is given to disparity information that is positioned inside the predetermined area that is determined in advance from the travel path than is given to disparity information that is positioned outside the predetermined area. Here, it is thought that the region around the travel path where the vehicle will travel is a road. Also, it is thought that it is highly likely that the region away from the travel path is not a road. Therefore, by more heavily weighting the disparity information that is positioned inside the area that is determined in advance from the travel path, the road surface detection device is able to inhibit disparity information that is positioned outside the area that is determined in advance from the travel path from affecting detection of the road surface region. Therefore, the road surface detection device is able to increase the road surface region detection accuracy.

In the second aspect described above, the path estimating portion may estimate the travel path, and estimate a curvature of a traveling lane of the vehicle based on the travel path. Also, when an amount of change per unit time in the curvature estimated by the path estimating portion is greater than a preset reference amount of change, the detecting portion may prohibit a process that gives the disparity information positioned outside the predetermined area that is determined in advance from the travel path in the captured image less weight than the disparity information positioned inside the predetermined area. For example, if the amount of change per unit time in the estimated curvature of the traveling lane is greater than the reference amount of change, the shape of the road is greatly fluctuating so the road shape following the estimated travel path will tend not to match the actual road shape. Therefore, not weighting the disparity information based on whether the disparity information is inside or outside of the predetermined area that is determined in advance from the travel path, when the amount of change per unit time in the estimated curvature of the traveling lane is greater than the reference amount of change makes it possible to inhibit the weight of disparity information corresponding to a region that is not the road surface region from increasing.

A third aspect of the invention relates to a road surface detection system. The road surface detection system includes a stereo camera that is mounted to a vehicle and captures an image of an area around the vehicle; and an ECU that estimates a potential road surface points that is a potential road surface in the image captured by the stereo camera, and detects a road surface region in the image based on the potential road surface point, and outputs information about the road surface region. The ECU estimates a travel path where the vehicle will travel, and links the travel path to pixels of the image captured by the stereo camera. The ECU gives a weight to the potential road surface point such that the weight is greater when a distance between the travel path and the potential road surface point in the image is close than when the distance between the travel path and the potential surface point in the image is far; and the ECU determines that the potential road surface point is the road surface region based on the weight given to the potential road surface point.

Thus, the invention makes it possible to increase the road surface region detection accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
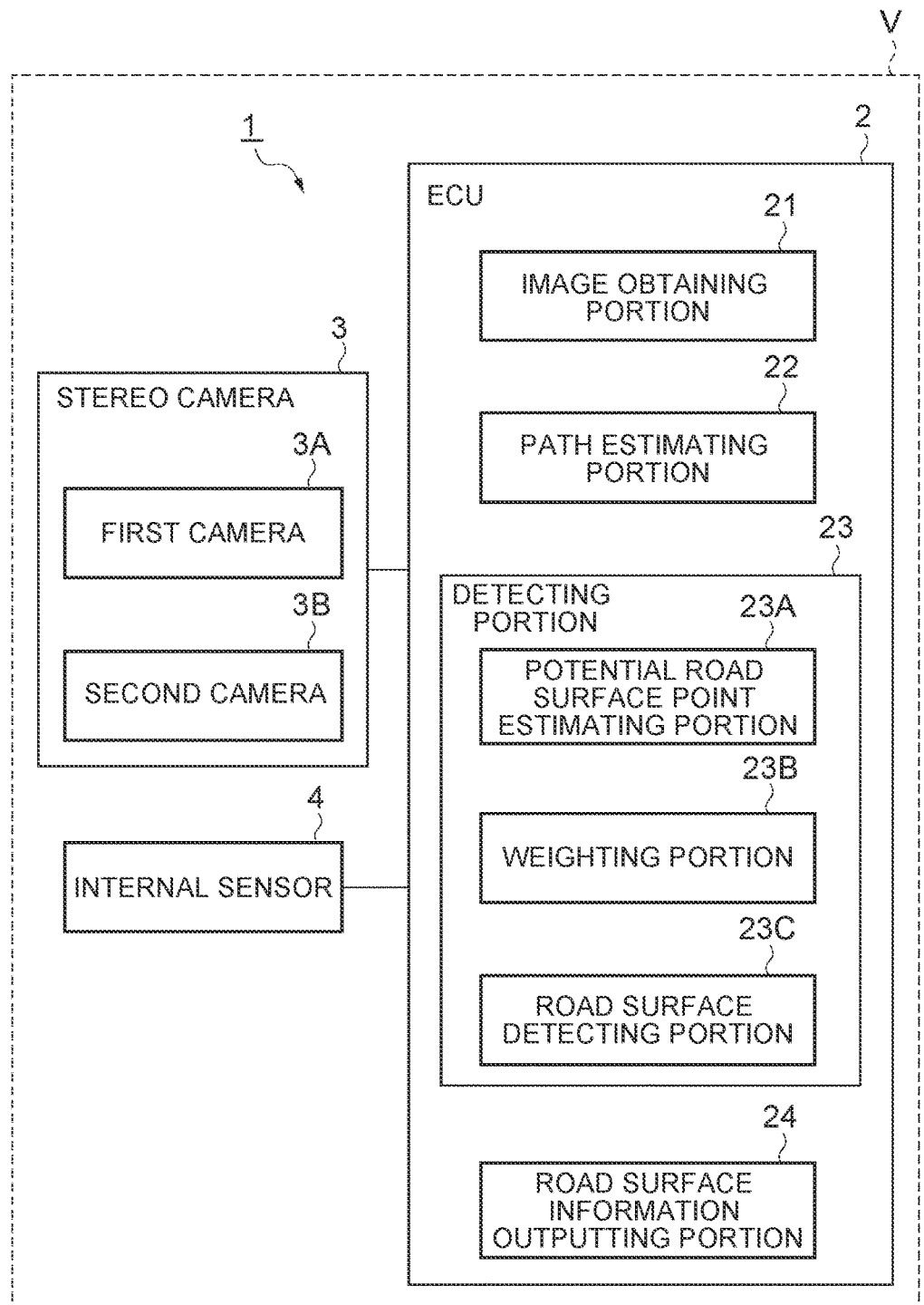
FIG. 1 is a view schematically showing the structure of a road surface detection device according to a first example embodiment of the invention.

Hereinafter, example embodiments of the invention will be described with reference to the accompanying drawings. In the description of the drawings, like elements will be denoted by like reference characters, and redundant descriptions will be omitted.

First Example Embodiment

First, a first example embodiment of the invention will be described. As shown in FIG. 1, a road surface detection device 1 according to the example embodiment is mounted in a vehicle V such as a passenger vehicle, for example, and detects a road surface region based on disparity information (distance information from an onboard camera) obtained from a captured image that captures an image of an area around the vehicle V. The road surface region is a road surface of a road on which the vehicle V is able to travel. In addition to a road surface of a road on which the vehicle V travels, the road surface region may also include an aisle in a parking lot and a road surface of a parking space.

The road surface detection device 1 obtains a captured image with an onboard camera that captures an image of an area around the vehicle V, and detects a road surface region based on disparity information (disparity) in a disparity image generated from the captured image. The disparity image is an image that includes disparity information.

As shown in FIG. 1, the road surface detection device 1 includes an ECU (Electronic Control Unit) 2 for detecting the road surface region, a stereo camera (onboard camera) 3, and an internal sensor 4. The ECU 2 is an electronic control unit that includes a CPU (Central Processing Unit), ROM (Read-Only Memory), and RAM (Random Access Memory) and the like. In the ECU 2, various processes are executed by loading a program stored in the ROM into the RAM and executing it with the CPU. The ECU 2 may also include a plurality of electronic control units.

The stereo camera 3 is an image obtaining device that obtains a captured image by capturing an image of an area around the vehicle V. The stereo camera 3 includes a first camera 3A and a second camera 3B that are arranged so as to reproduce binocular disparity. The first camera 3A and the second camera 3B are provided behind a front windshield of the vehicle V and capture an image of the area in front of the vehicle V, for example.

The road surface detection device 1 may also be a monocular camera instead of the stereo camera 3. A monocular camera is also able to obtain a disparity image by a well-known method (for example, a method that uses an image temporal difference).

The internal sensor 4 is a detection device that detects a traveling state of the vehicle V. The internal sensor 4 includes a vehicle speed sensor and a yaw rate sensor, for example. The vehicle speed sensor is a detector that detects the speed of the vehicle V. A wheel speed sensor that is provided on a wheel of the vehicle V or on a drive shaft that rotates together with the wheels, for example, may be used for the vehicle speed sensor. The vehicle speed sensor transmits the detected vehicle speed information (vehicle driving information) to the ECU. The yaw rate sensor is a detector that detects the yaw rate around a vertical axis of the center of gravity of the vehicle V. A gyro sensor, for example, may be used as the yaw rate sensor. The yaw rate sensor transmits the detected yaw rate information of the vehicle V (vehicle driving information) to the ECU 2.

Next, the functional structure of the ECU 2 will be described. As shown in FIG. 1, the ECU 2 has an image obtaining portion 21, a path estimating portion 22, a detecting portion 23, and a road surface information outputting portion 24.

The image obtaining portion 21 obtains the captured image captured by the stereo camera 3. The image obtaining portion 21 generates a disparity image that includes disparity information by a well-known method, based on the captured image from the first camera 3A and the captured image from the second camera 3B of the stereo camera 3, for example. The disparity information is included in pixels that make up the disparity image, for example. Hereinafter, a pixel in the disparity image that includes disparity information will be referred to as a disparity point.

The path estimating portion 22 estimates the travel path where the vehicle V will travel, based on the detection results (driving information) of the vehicle sensor and the yaw rate sensor of the internal sensor 4. For example, the path estimating portion 22 may estimate the travel path by presuming that the current speed and yaw rate state detected by the vehicle speed sensor and yaw rate sensor will continue. The path estimating portion 22 may also estimate the travel path using information other than the detection results of the vehicle speed sensor and the yaw rate sensor (for example, a steering angle detected by a steering angle sensor (vehicle driving information) or the like).

The detecting portion 23 detects the road surface region in the captured image based on the disparity information. The detecting portion 23 detects the road surface region while inhibiting the use of disparity information positioned on a side away from the travel path of the vehicle V more than disparity information positioned on a side near the travel path of the vehicle V on the captured image, when detecting the road surface region. Inhibiting the use of the disparity information is lessening the effect that the disparity information has on the detection of the road surface region. Specifically, the detecting portion 23 weights the disparity information included in the disparity image, and detects the road surface region in the captured image based on the weighted disparity information. More specifically, the detecting portion 23 has a potential road surface point estimating portion 23A, a weighting portion 23B, and a road surface detecting portion 23C.

The potential road surface point estimating portion 23A estimates a disparity point corresponding to the road surface, from among a plurality of disparity points in the disparity image, as a potential road surface point. The potential road surface point estimating portion 23A estimates, by a known method, whether the disparity point is a disparity point corresponding to the road surface, or a disparity point corresponding to a three-dimensional object or the like other than the road surface.

Figure 2:
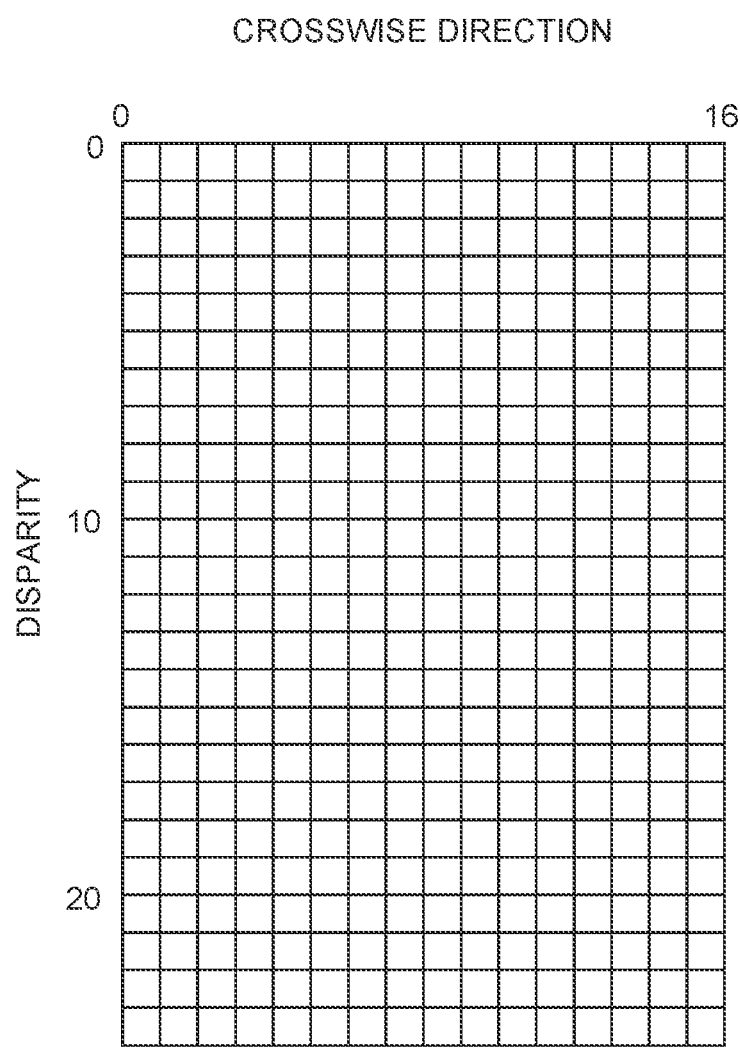
FIG. 2 is a view of a disparity voting map with a position in the crosswise direction in the disparity image as the horizontal axis and disparity as the vertical axis.

As an example, the potential road surface point estimating portion 23A may estimate the potential road surface point in the manner described below. The potential road surface point estimating portion 23A sets a disparity voting map as shown in FIG. 2. The disparity voting map in FIG. 2 is made up of a plurality of square blocks arranged such that a side in the crosswise direction is set to correspond to a position in the crosswise direction (horizontal direction) of the disparity image, and a side in the vertical direction is set to correspond to the amount of disparity. The potential road surface point estimating portion 23A groups (votes) a disparity point to a corresponding block, from among the plurality of blocks that make up the disparity voting map, based on the position of the disparity point in the disparity image and the amount of the disparity of the disparity point. In this way, the potential road surface point estimating portion 23A matches the disparity points with the blocks of the disparity voting map.

Next, the potential road surface point estimating portion 23A calculates, for each block of the disparity voting map, an average value of disparity, a deviation of disparity, an average value of the coordinates of the disparity points in the vertical direction of the disparity image, and a deviation of the coordinates of the disparity points in the vertical direction of the disparity image. The potential road surface point estimating portion 23A sets, for each block in the disparity voting map, attributes of a road surface to those blocks in which the distribution of the disparity points in the vertical direction is small and the distribution of the disparity points in the disparity direction is large. More specifically, the potential road surface point estimating portion 23A determines whether the distribution of the disparity points in the vertical direction (i.e., the deviation of the coordinates of the disparity points in the vertical direction of the disparity image) is less than a preset first threshold value, for example. Also, the potential road surface point estimating portion 23A determines whether the distribution in the disparity direction (i.e., the deviation of the coordinates of the disparity points in the vertical direction of the disparity image/the deviation of the disparity) is less than a second threshold value, for example. If the distribution of the disparity points in the vertical direction is less than the preset first threshold value and the distribution in the disparity direction is less than the second threshold value, the potential road surface point estimating portion 23A sets attributes of a road surface to that block. The potential road surface point estimating portion 23A sets attributes other than those of a road surface (e.g., attributes of a three-dimensional object) to blocks that do not satisfy the conditions described above.

The potential road surface point estimating portion 23A estimates a disparity point grouped to a block to which the attribute of a road surface has been set, as a potential road surface point. Here, a disparity point other than a disparity point corresponding to the road surface may also be estimated as a potential road surface point due to accuracy error of the disparity image or the like. Therefore, the detecting portion 23 weights the estimated potential road surface points in the manner described below, in order to eliminate accuracy error and the like and thus accurately detect the road surface region.

The weighting portion 23B weights the potential road surface points estimated by the potential road surface point estimating portion 23A. The weighting portion 23B gives less weight to the potential road surface points that are positioned on the side away from the travel path than to potential road surface points that are positioned on the side near the travel path estimated by the path estimating portion 22 in the captured image.

More specifically, the weighting portion 23B projects the travel path estimated by the path estimating portion 22 onto the captured image captured by the stereo camera 3. As a result, the travel path is linked to the pixels on the captured image captured by the stereo camera 3. Either captured image that is captured by the first camera 3A or the second camera 3B may be used as the captured image that the weighting portion 23B uses when performing the weighting. The weighting portion 23B increases the weight (i.e., amount of weight) the closer a potential road surface point is to a projected travel path K in the horizontal direction (crosswise direction), as in a captured image P from the stereo camera 3 shown in FIG. 3. For example, a potential road surface point A may be given a weight of "1", and a potential road surface point B that is closer to the travel path K than the potential road surface point A may be given a weight of "2". In this way, the weighting portion 23B sets the weight for each potential road surface point estimated as a road surface, based on the distance from the travel path K. Here, a larger value of the weight given to a potential road surface point indicates a greater tendency for the position of the weighted potential road surface point to be detected as a road surface region.

Figure 3:
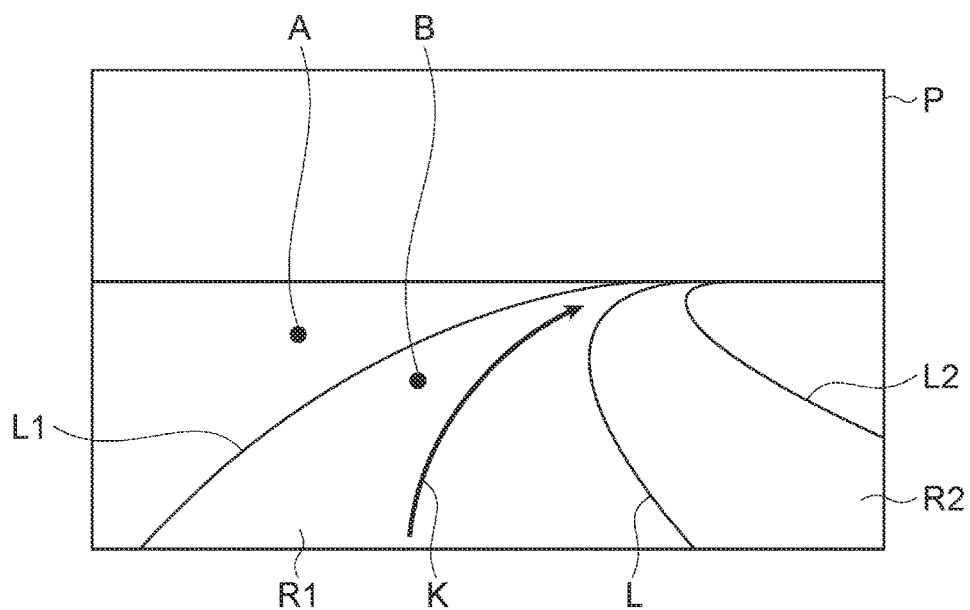
FIG. 3 is a view of a travel path on the captured image.

Here, FIG. 3 is a captured image that captures an area in front of the vehicle V. White lines (lane boundary lines) L and L1 that form a vehicle traveling lane, and a white line L2 that, together with the white line L, forms an adjacent lane, are shown in FIG. 3. Reference character R1 denotes the traveling lane of the vehicle V. Reference character R2 denotes the opposite lane (adjacent lane).

The road surface detecting portion 23C detects the road surface region in the captured image based on the weighted potential road surface points. The road surface detecting portion 23C more strongly applies potential road surface points with more weight than potential road surface points with less weight, to the detection of the road surface region. More specifically, the road surface detecting portion 23C more readily detects the positions of heavily weighted potential road surface points, than the positions of lightly weighted potential road surface points, as the road surface region.

Figure 4:
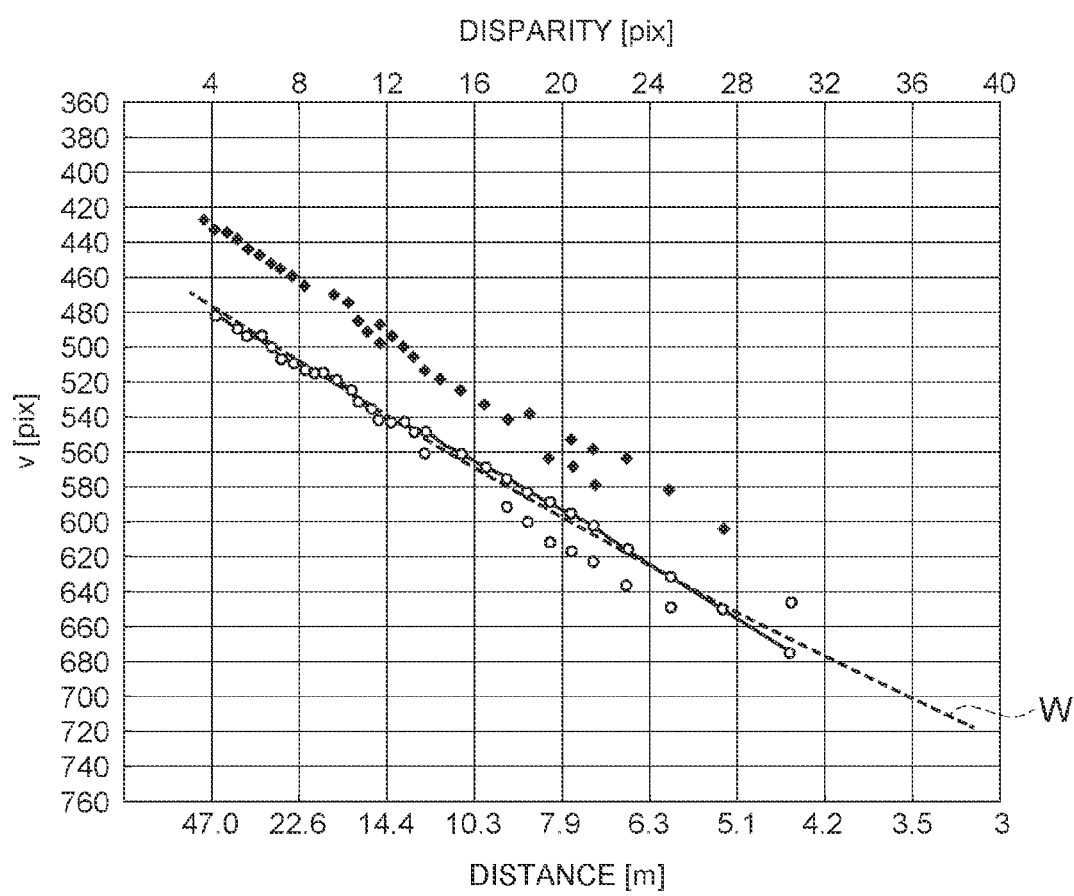
FIG. 4 is a view of an example of the road surface region displayed on a V-disparity image.

For example, the road surface detecting portion 23C is able to detect the road surface region based on the disparity of the potential road surface points using a known V-disparity image, for example. As shown in FIG. 4, the V-disparity image is a graph with the disparity (the distance indicated by the disparity) on the horizontal axis, and the coordinates in the vertical direction of the disparity image on the vertical axis, which obtains a histogram in the horizontal direction with respect to the disparity image. In the disparity image, the road surface region is such that the disparity changes uniformly as the coordinates in the vertical direction of the disparity image change, for example. Therefore, as shown in FIG. 4, the road surface region is projected as a line segment W that extends in diagonally (i.e., an oblique direction), on the V-disparity image.

The road surface detecting portion 23C reflects the potential road surface points in the V-disparity image in such a manner that those potential road surface points that are more heavily weighted are more strongly applied to the detection of the road surface region. When reflecting the potential road surface points in the V-disparity image, the potential road surface point estimating portion 23A assumes that there are a number of potential road surface points according to the value of the weight, for example, and reflects the number of potential road surface points according to the value of the weight in the V-disparity image. For example, when a weight of "2" is given to a potential road surface point X, the potential road surface point estimating portion 23A assumes that there are two potential road surface points X, and reflects two potential road surface points X in the V-disparity image. As a result, more heavily weighted potential road surface points are applied more strongly to the detection of the road surface region.

The road surface detecting portion 23C detects the road surface region using potential road surface points, but the road surface detecting portion 23C may also detect a gradient of the road surface as the road surface region.

The road surface information outputting portion 24 outputs information regarding the road surface region detected by the detecting portion 23 to an external device. The road surface information outputting portion 24 may also output road surface information to an ECU that automatically drives the vehicle V or an ECU that assists with driving the vehicle V, for example.

Figure 5:
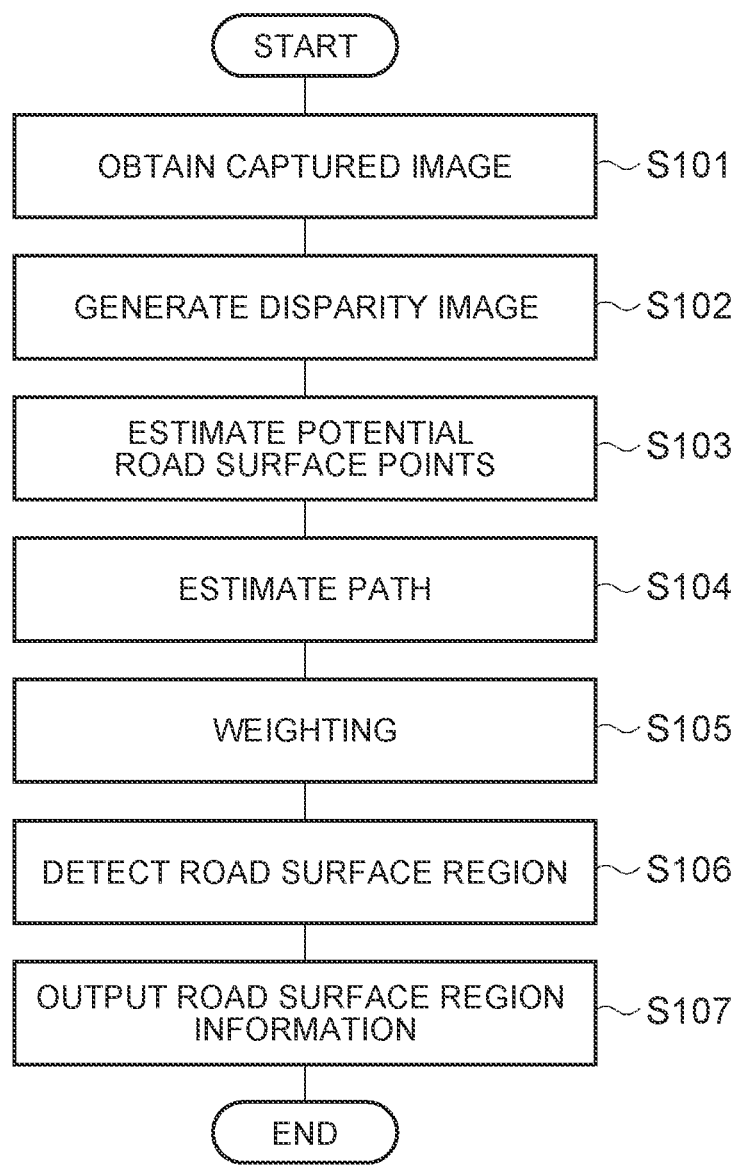
FIG. 5 is a flowchart illustrating the flow of a road surface region detection routine of the road surface detection device.

Next, the flow of a road surface region detection routine performed by the road surface detection device 1 will be described with reference to the flowchart in FIG. 5. The routine in the flowchart shown in FIG. 5 is executed at preset intervals of time while the vehicle V is being driven by an engine. The image obtaining portion 21 obtains the captured image captured by the stereo camera 3 (S101). The image obtaining portion 21 generates a disparity image based on the obtained captured image (S102).

The potential road surface point estimating portion 23A estimates the potential road surface points based on the generated disparity image (S103). The path estimating portion 22 estimates the travel path of the vehicle V based on the detection results of the internal sensor 4 (S104). The weighting portion 23B weights the potential road surface points estimated by the potential road surface point estimating portion 23A according to their distance from the travel path (S105). The road surface detecting portion 23C detects the road surface region based on the disparity of the potential road surface points using a known V-disparity image or the like, for example (S106). The road surface information outputting portion 24 outputs the information about the road surface region detected by the detecting portion 23 to an external device (S107).

The example embodiment is configured as described above. In this road surface detection device 1, more weight is given to potential road surface points that are positioned on the side near the travel path K than is given to potential road surface points that are positioned on the side away from the travel path K. Here, it is thought that the region around the travel path K where the vehicle will travel is a road. Also, it is thought that it is highly likely that the region away from the travel path K is not a road. Therefore, by more heavily weighting the potential road surface points that are positioned on the side near the travel path K, the road surface detection device 1 is able to inhibit potential road surface points that are positioned on the side away from the travel path K from affecting detection of the road surface region. Therefore, the road surface detection device 1 is able to increase the road surface region detection accuracy.

Modified Example of First Example Embodiment

Next, a modified example of the first example embodiment will be described. In this modified example, the weighting portion 23B shown in FIG. 1 does not have to weight the potential road surface points as described above when an amount of change per unit time in a curvature of the traveling lane that the vehicle V is traveling in is large. More specifically, the path estimating portion 22 sets the travel path, as well as estimates the curvature of the traveling lane of the vehicle V based on the travel path. For example, the path estimating portion 22 may estimate the curvature of the estimated travel path as the curvature of the traveling lane.

The weighting portion 23B determines whether the amount of change per unit time in the curvature of the traveling lane estimated by the path estimating portion 22 is greater than a preset reference amount of change. If the amount of change per unit time in the curvature is greater than the reference amount of change, a process that gives the potential road surface points positioned on the side away from the travel path less weight than the potential road surface points positioned on the side near the travel path estimated by the path estimating portion 22 in the captured image is not performed.

For example, if the amount of change per unit time in the estimated curvature of the traveling lane is greater than the reference amount of change, the shape of the road is greatly fluctuating so the road shape following the estimated travel path will tend not to match the actual road shape. For example, a situation in which the amount of change in the curvature of the traveling lane is large may be a situation in which the road shape changes from straight to curved, or a situation in which the road shape changes from curved to straight, or the like. Therefore, not weighting the potential road surface points based on the distance from the travel path when the amount of change per unit time in the estimated curvature of the traveling lane is greater than the reference amount of change makes it possible to inhibit the weight of potential road surface points corresponding to a region that is not the road surface region from increasing.

Second Example Embodiment

Figure 6:
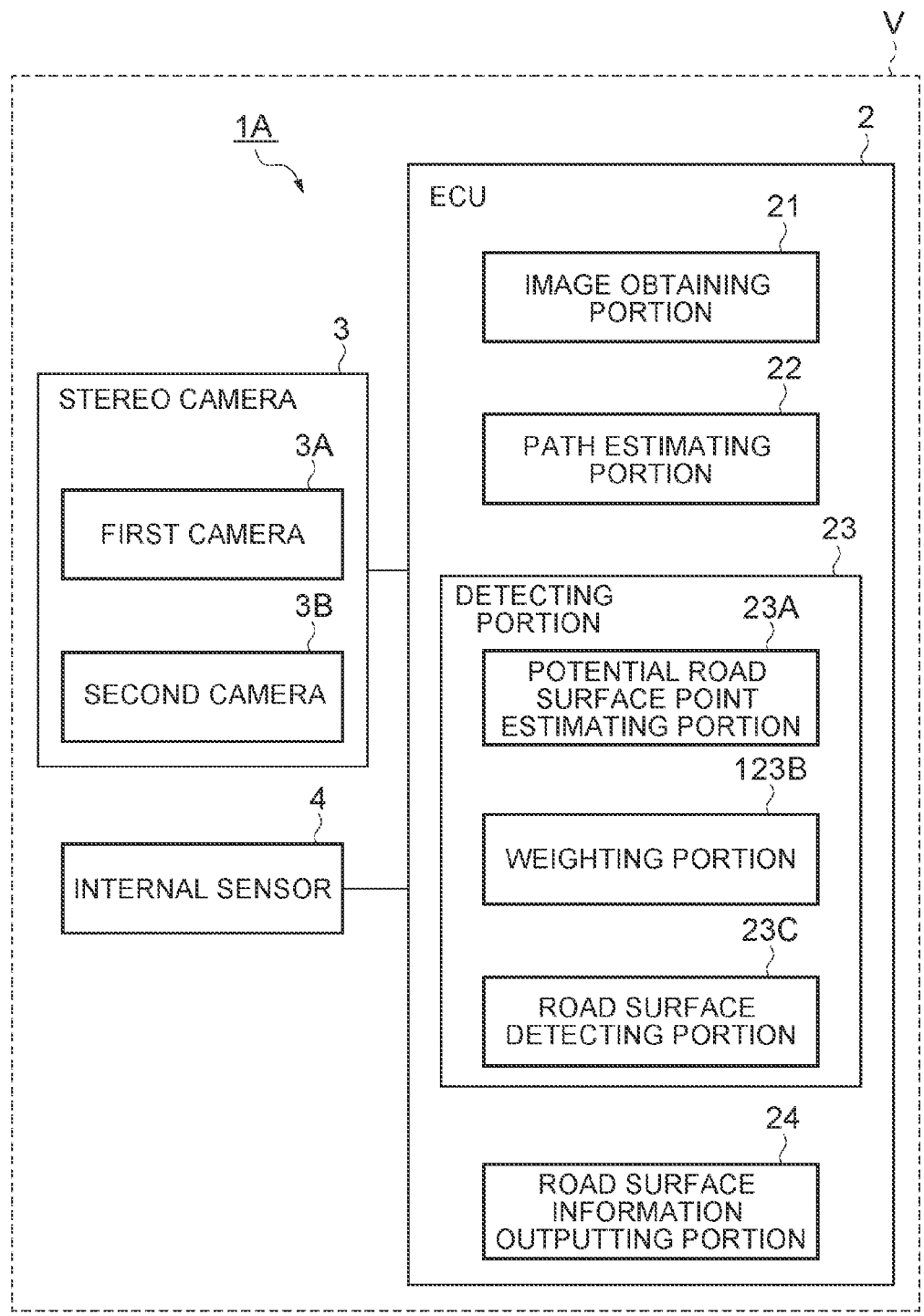
FIG. 6 is a view schematically showing the structure of a road surface detection device according to a second example embodiment of the invention.

Next, a second example embodiment of the invention will be described. FIG. 6 is a view schematically showing the structure of a road surface detection device according to this second example embodiment. As shown in FIG. 6, a road surface detection device 1A according to this example embodiment has a weighting portion 123B instead of the weighting portion 23B of the road surface detection device 1 according to the first example embodiment. In the road surface detection device 1A, the constituent elements other than the weighting portion 123B are the same as the constituent elements of the road surface detection device 1 according to the first example embodiment. Consequently, the other constituent elements will be denoted by the same reference characters, and detailed descriptions of the other constituent elements will be omitted.

The detecting portion 23 includes the potential road surface point estimating portion 23A, the weighting portion 123B, and the road surface detecting portion 23C. The weighting portion 123B weights the potential road surface points estimated by the potential road surface point estimating portion 23A. The weighting portion 123B gives less weight to the potential road surface points positioned outside of a predetermined area that is determined in advance from a travel path estimated by the path estimating portion 22 in the captured image, than to potential road surface points positioned inside of the predetermined area.

Figure 7:
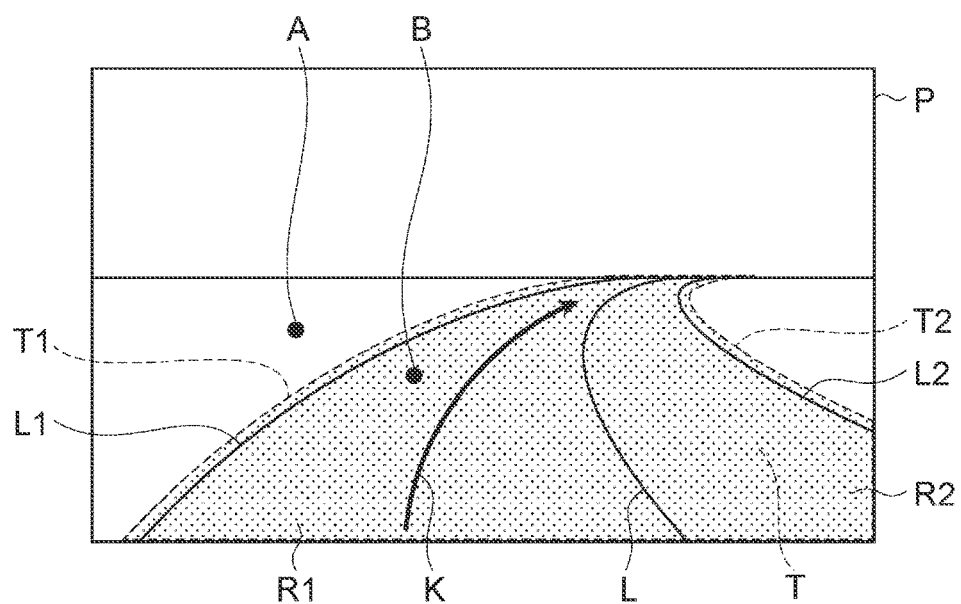
FIG. 7 is a view of a travel area on a captured image.

Here, the weighting portion 123B uses a travel area that is an area of a road where the vehicle V travels, as the predetermined area. The weighting portion 123B sets the travel area based on a travel path estimated by the path estimating portion 22. For example, in Japan, the weighting portion 123B sets the travel area assuming a road with one lane on each side (i.e., assuming a road in which a lane in which the vehicle V is traveling (i.e., a traveling lane R) and a lane in which an oncoming vehicle is traveling (i.e., opposite lane R2) are each one lane). More specifically, as shown in FIG. 7, for example, the weighting portion 123B sets a boundary line T1 in a position 2.5 meters to the left of the travel path K when viewed from the vehicle V. The weighting portion 123B sets a boundary line T2 in a position 4.5 meters to the right of the travel path K. The position 2.5 meters to the left of the travel path K is a position 2.5 meters to the left, in the horizontal direction, of the actual travel path K. The position 4.5 meters to the right of the travel path K is a position 4.5 meters to the right, in the horizontal direction, of the actual travel path K. The weighting portion 123B projects these boundary lines T1 and T2 that are set in positions predetermined distances away from the actual travel path K onto the captured image from the stereo camera 3. The weighting portion 123B is able to set the region between the boundary line T1 and the boundary line T2 projected onto the captured image as a travel area T. The travel area T is not limited to being offset in the horizontal direction with respect to the travel path K. The travel area T is not limited to being set assuming a road with one lane on each side.

The weighting portion 123B gives less weight to a potential road surface point positioned outside of the travel area T than to a potential road surface point positioned inside of the travel area T, in the captured image. For example, in the example shown in FIG. 7, the weighting portion 123B may give a potential road surface point A positioned outside the travel area T a weight of "1", and give a potential road surface point B positioned inside the travel area T a weight of "2". In this way, the weighting portion 123B sets the weight of a potential road surface point estimated as the road surface based on whether the potential road surface point is positioned inside the travel area T or outside the travel area T. The road surface detecting portion 23C detects the road surface region in the captured image based on the potential road surface points weighted by the weighting portion 123B, similar to the first example embodiment.

Figure 8:
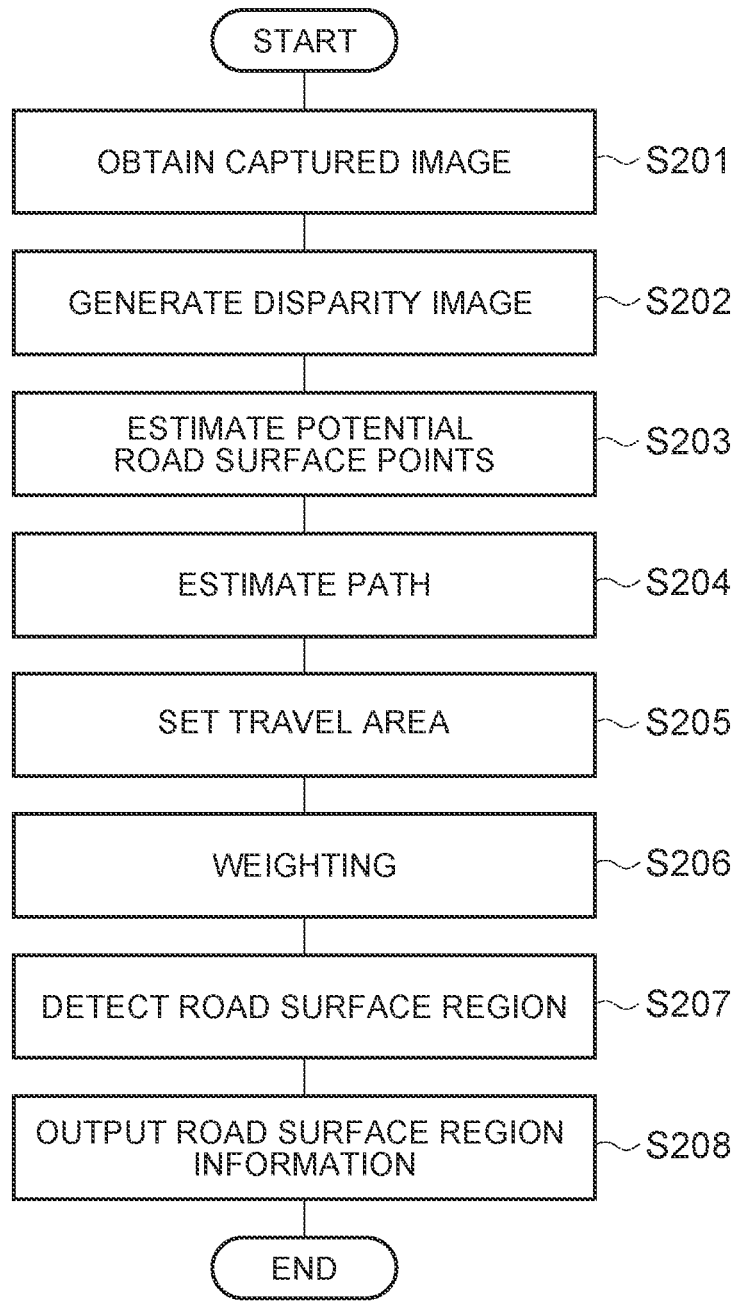
FIG. 8 is a flowchart illustrating the flow of a road surface region detection routine of the road surface detection device.

Next, the flow of a road surface region detection routine performed by the road surface detection device 1A will be described with reference to the flowchart in FIG. 8. The routine in the flowchart shown in FIG. 8 is executed at preset intervals of time while the vehicle V is being driven by an engine. The image obtaining portion 21 obtains the captured image captured by the stereo camera 3 (S201). The image obtaining portion 21 generates a disparity image based on the obtained captured image (S202). The potential road surface point estimating portion 23A estimates the potential road surface points based on the generated disparity image (S203).

The path estimating portion 22 estimates the travel path of the vehicle V based on the detection results of the internal sensor 4 (S204). The weighting portion 123B sets the travel area based on the travel path (S205). The weighting portion 123B weights the potential road surface points based on whether the potential road surface points are positioned inside the travel area T or are positioned outside the travel area T (S206). The road surface detecting portion 23C detects the road surface region based on the disparity of the potential road surface points using a known V-disparity image or the like, for example (S207). The road surface information outputting portion 24 outputs the information about the road surface region detected by the detecting portion 23 to an external device (S208).

The example embodiment is configured as described above. In this road surface detection device 1A, more weight is given to potential road surface points that are positioned inside the travel area T than is given to potential road surface points that are positioned outside the travel area T. Here, it is thought that the region around the travel path K where the vehicle will travel is a road. Also, it is thought that it is highly likely that the region away from the travel path K is not a road. Therefore, by more heavily weighting the potential road surface points that are positioned inside the travel area T set based on the travel path K, the road surface detection device 1A is able to inhibit potential road surface points that are positioned outside the travel area T from affecting detection of the road surface region. Therefore, the road surface detection device 1A is able to increase the road surface region detection accuracy.

Modified Example of Second Example Embodiment

Next, a modified example of the second example embodiment will be described. In this modified example, the weighting portion 123B shown in FIG. 6 does not have to weight the potential road surface points as described above when an amount of change per unit time in the curvature of the traveling lane that the vehicle V is traveling in is large. More specifically, the path estimating portion 22 sets the travel path, as well as estimates the curvature of the traveling lane of the vehicle V based on the travel path. For example, the path estimating portion 22 may estimate the curvature of the estimated travel path as the curvature of the traveling lane.

The weighting portion 123B determines whether the amount of change per unit time in the curvature of the traveling lane estimated by the path estimating portion 22 is greater than a preset reference amount of change. If the amount of change per unit time in the curvature is greater than the reference amount of change, a process that gives potential road surface points that are positioned outside of the travel area T in the captured image less weight than potential road surface points that are positioned inside of the travel area T in the captured image is not performed. That is, when the amount of change per unit time in the curvature is greater than the reference amount of change, a process that gives the potential road surface points positioned outside the travel area T in the captured image less weight than the potential road surface points positioned inside the travel area T in the captured image is prohibited.

For example, if the amount of change per unit time in the estimated curvature of the traveling lane is greater than the reference amount of change, the shape of the road is greatly fluctuating so the road shape following the estimated travel path will tend not to match the actual road shape. Therefore, not weighting the potential road surface points based on whether the potential road surface points are positioned inside the travel area T or outside of the travel area T when the amount of change per unit time in the estimated curvature of the traveling lane is greater than the reference amount of change makes it possible to inhibit the weight of potential road surface points corresponding to a region that is not the road surface region from increasing.

While example embodiments of the invention and modified examples thereof have been described, the invention is not limited to these example embodiments and modified examples. For example, in the example embodiments and modified examples, the path estimating portion 22 may estimate the travel path where the vehicle V will travel based on the captured image of the stereo camera 3. For example, the path estimating portion 22 calculates an optical flow of an object in the captured image from the captured image (vehicle driving information) from the stereo camera 3. Then, the path estimating portion 22 estimates the direction of travel of the vehicle V based on the calculated optical flow. The path estimating portion 22 may also estimate the travel path of the vehicle V based on the estimated direction of travel.

What is claimed is:

1. A road surface detection device that detects a road surface region based on disparity information obtained from a captured image of an area around a vehicle, comprising:
    an onboard camera that obtains the captured image of the area around the vehicle and is configured to generate a disparity image that includes disparity information;
    a path estimating portion that estimates a travel path where the vehicle will travel, based on driving information of the vehicle; and
    a detecting portion that weights the disparity information of the disparity image generated by the onboard camera, and detects a road surface region in the captured image based on the weighted disparity information, wherein
    when the detecting portion weights the disparity information, the detecting portion gives less weight to the disparity information positioned on a side away from the travel path in the captured image than to the disparity information positioned on a side near the travel path in the captured image.

2. The road surface detection device according to claim 1, wherein
    the path estimating portion estimates the travel path, and estimates a curvature of a traveling lane of the vehicle based on the travel path; and
    when an amount of change per unit time in the curvature estimated by the path estimating portion is greater than a preset reference amount of change, the detecting portion prohibits a process that gives the disparity information positioned on the side away from the travel path in the captured image less weight than the disparity information positioned on the side near the travel path in the captured image.

3. A road surface detection device that detects a road surface region based on disparity information obtained from a captured image of an area around a vehicle, comprising:
    an onboard camera that obtains the captured image and is configured to generate a disparity image that includes disparity information;
    a path estimating portion that estimates a travel path where the vehicle will travel, based on driving information of the vehicle; and
    a detecting portion that weights the disparity information of the disparity image generated by the onboard camera, and detects a road surface region in the captured image based on the weighted disparity information, wherein
    when the detecting portion weights the disparity information, the detecting portion gives less weight to the disparity information positioned outside a predetermined area that is determined in advance from the travel path in the captured image than to the disparity information positioned inside the predetermined area.

4. The road surface detection device according to claim 3, wherein
    the path estimating portion estimates the travel path, and estimates a curvature of a traveling lane of the vehicle based on the travel path; and
    when an amount of change per unit time in the curvature estimated by the path estimating portion is greater than a preset reference amount of change, the detecting portion prohibits a process that gives the disparity information positioned outside the predetermined area that is determined in advance from the travel path in the captured image less weight than the disparity information positioned inside the predetermined area.

5. A road surface detection system comprising:
    a stereo camera that is mounted to a vehicle and captures an image of an area around the vehicle and generates a disparity image that includes disparity information; and an ECU that estimates a potential road surface point, based on the disparity information, that is a potential road surface in the image captured by the stereo camera, and detects a road surface region in the image based on the potential road surface point, and outputs information about the road surface region, wherein the ECU estimates a travel path where the vehicle will travel, and links the travel path to pixels of the image captured by the stereo camera;

the ECU gives a weight to the potential road surface point such that the weight is greater when a distance between the travel path and the potential road surface point in the image is close than when the distance between the travel path and the potential surface point in the image is far; and the ECU determines that the potential road surface point is the road surface region based on the weight given to the potential road surface point.

\* \* \* \* \*